(12) United States Patent
Fukuda et al.

(10) Patent No.: US 12,356,517 B2
(45) Date of Patent: Jul. 8, 2025

(54) LIGHT SOURCE DEVICE, DIELECTRIC BARRIER DISCHARGE LAMP LIGHTING CIRCUIT, DIELECTRIC BARRIER DISCHARGE LAMP LIGHTING METHOD

(71) Applicant: Ushio Denki Kabushiki Kaisha, Tokyo (JP)

(72) Inventors: Minoru Fukuda, Tokyo (JP); Takanori Samejima, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 56 days.

(21) Appl. No.: 18/252,475

(22) PCT Filed: Oct. 12, 2021

(86) PCT No.: PCT/JP2021/037698
§ 371 (c)(1),
(2) Date: May 10, 2023

(87) PCT Pub. No.: WO2022/102318
PCT Pub. Date: May 19, 2022

(65) Prior Publication Data
US 2023/0413398 A1 Dec. 21, 2023

(30) Foreign Application Priority Data
Nov. 11, 2020 (JP) ................................. 2020-187998

(51) Int. Cl.
*H05B 41/38* (2006.01)
*H05B 41/282* (2006.01)
(52) U.S. Cl.
CPC ......... *H05B 41/282* (2013.01); *H05B 41/382* (2013.01)

(58) Field of Classification Search
CPC .... H05B 41/24; H05B 41/282; H05B 41/382; H05B 41/2806; H05B 41/2822;
(Continued)

(56) References Cited

U.S. PATENT DOCUMENTS 5,436,532 A * 7/1995 Benard ............... H05B 41/2824
315/276
5,831,394 A * 11/1998 Huber .................... H05B 41/34
315/246
(Continued)

FOREIGN PATENT DOCUMENTS

DE 19912981 C1 12/2000
JP H10-223384 A 8/1998
(Continued)

OTHER PUBLICATIONS

Notification of Transmittal of Translation of the International Preliminary Report on Patentability and Translation of Written Opinion of the International Searching Authority; PCT/JP2021/037698; mailed on May 25, 2023.
(Continued)

*Primary Examiner* — Tung X Le
(74) *Attorney, Agent, or Firm* — Studebaker Brackett PLLC

(57) ABSTRACT

The lighting circuit for lighting a dielectric barrier discharge lamp includes a direct-current power source, a transformer having a primary winding connected to a positive electrode-side terminal of the direct-current power source and a secondary winding connected to the dielectric barrier discharge lamp, a closed circuit in which the direct-current power source, the primary winding, and a switching element including a parasitic diode are serially connected, and a controller to perform ON/OFF control of the switching element. The controller executes a first step to shift the switching element from an ON state to an OFF state and a
(Continued)

second step to shift the switching element from the OFF state to the ON state after a lapse of a predetermined OFF holding time from when a regenerative current flowing through the primary winding reaches a zero value after the first step.

10 Claims, 13 Drawing Sheets

(58) Field of Classification Search
CPC .............. H05B 41/2825; H05B 41/2828; H05B 45/37; H05B 45/385; H05B 45/3725
See application file for complete search history.

(56) References Cited

U.S. PATENT DOCUMENTS

| | | | |
|---|---|---|---|
| 6,084,360 A | 7/2000 | Yokokawa et al. | |
| 6,356,033 B1* | 3/2002 | Okamoto | H05B 41/24 315/206 |
| 6,541,924 B1* | 4/2003 | Kane | H05B 41/24 315/246 |
| 7,633,236 B2* | 12/2009 | Matsumoto | H05B 41/2806 315/246 |
| 2007/0115088 A1* | 5/2007 | Sugioka | H05B 41/2806 336/232 |
| 2009/0174339 A1* | 7/2009 | Bleukx | H05B 41/2806 315/276 |
| 2012/0104960 A1 | 5/2012 | Liu et al. | |
| 2014/0268966 A1* | 9/2014 | Kamata | H01F 3/14 363/131 |

FOREIGN PATENT DOCUMENTS

| | | |
|---|---|---|
| JP | 2000-092968 A | 4/2000 |
| JP | 2001-093684 A | 4/2001 |

OTHER PUBLICATIONS

International Search Report issued in PCT/JP2021/037698; mailed Dec. 14, 2021.

The extended European search report issued by the European Patent Office on May 8, 2024, which corresponds to European Patent Application No. 21891565.0, and is related to U.S. Appl. No. 18/252,475.

* cited by examiner

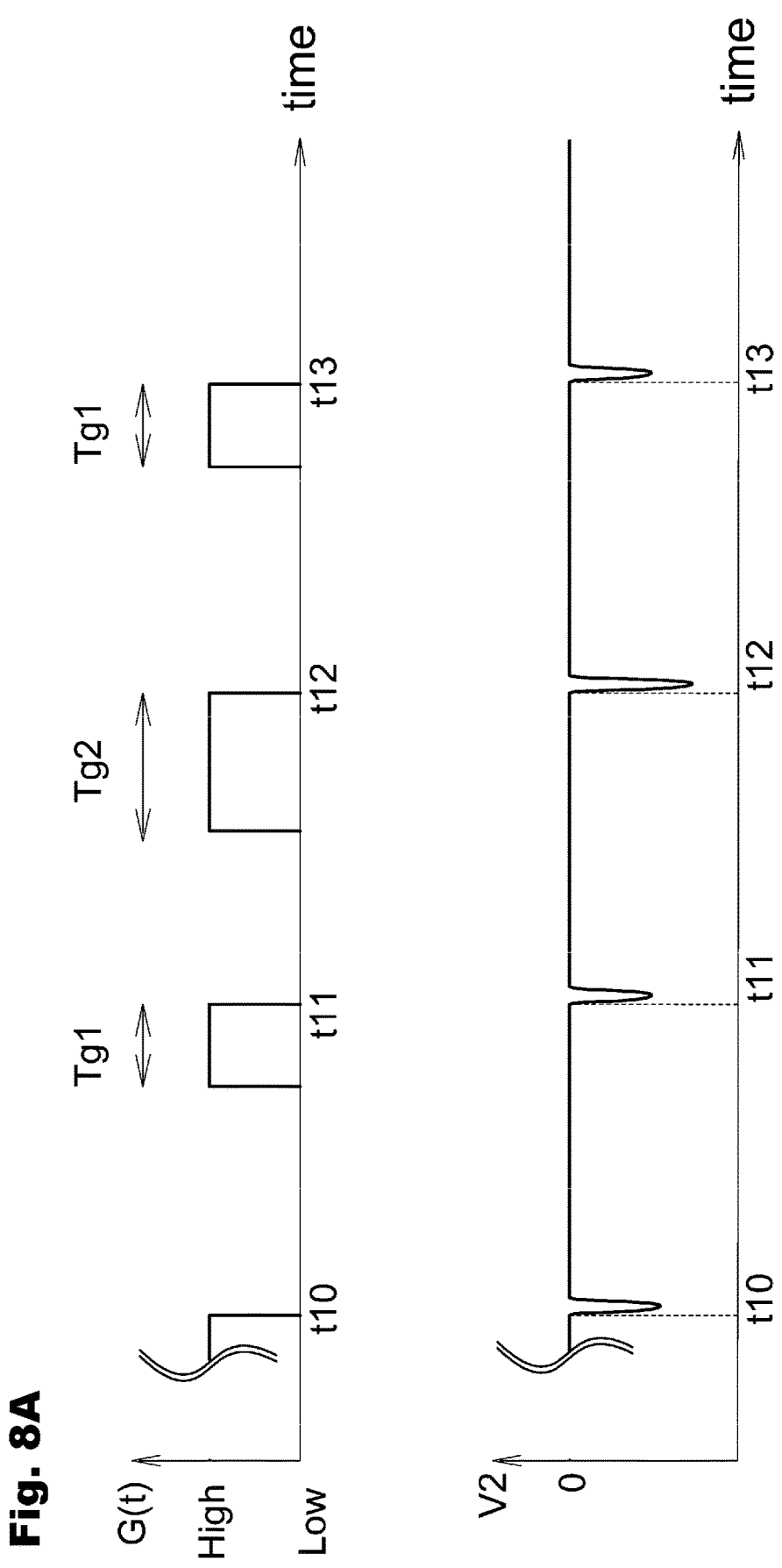

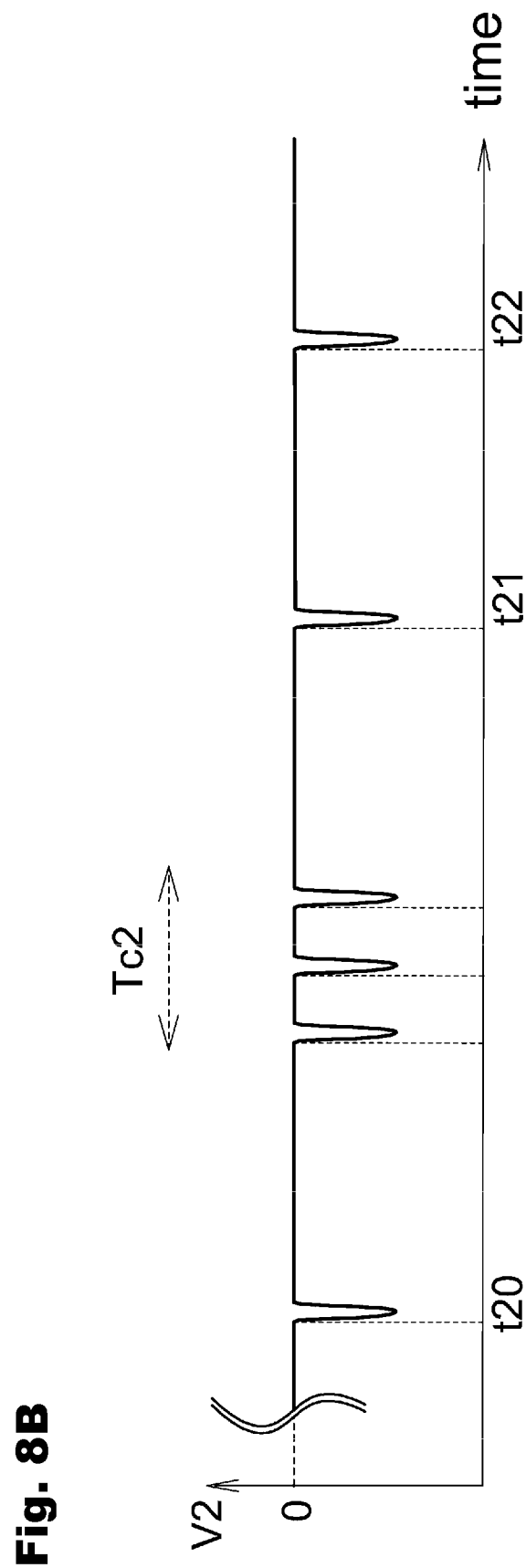

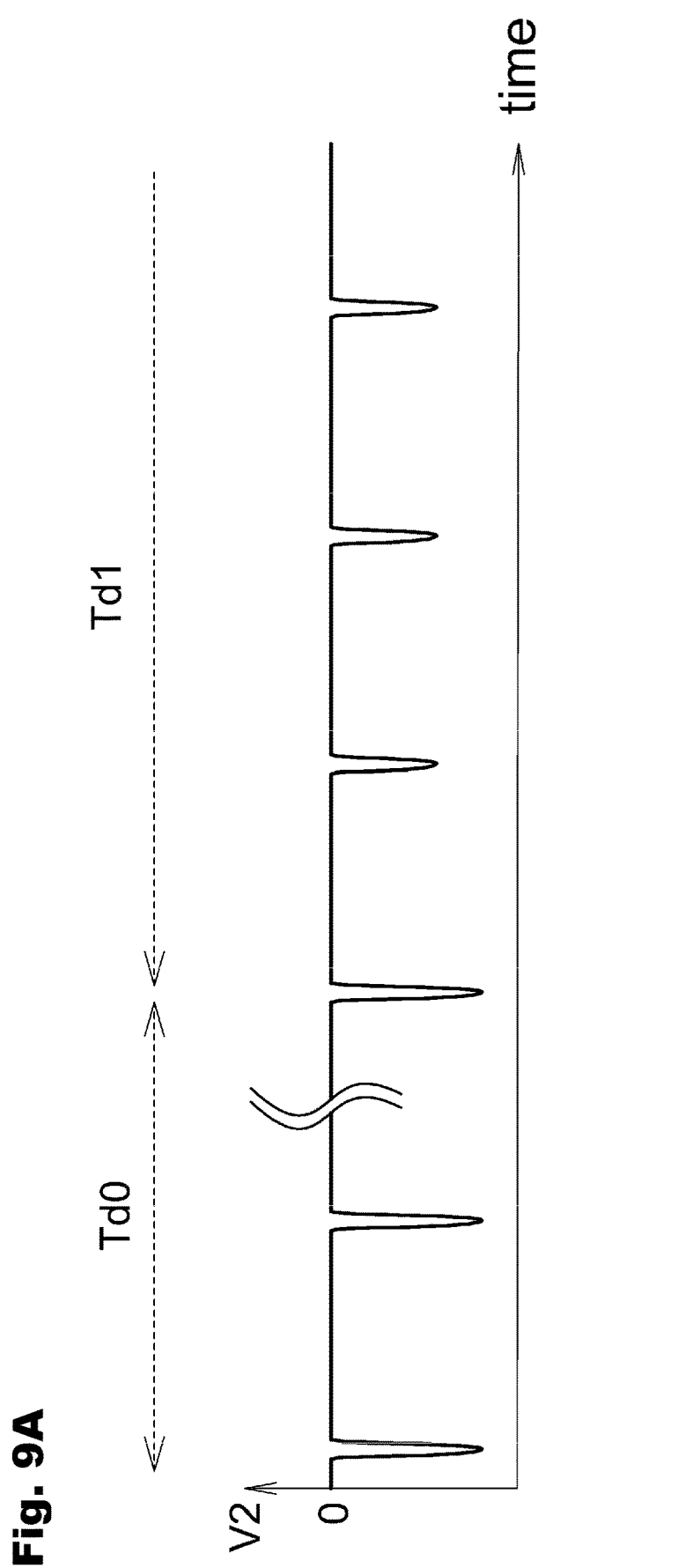

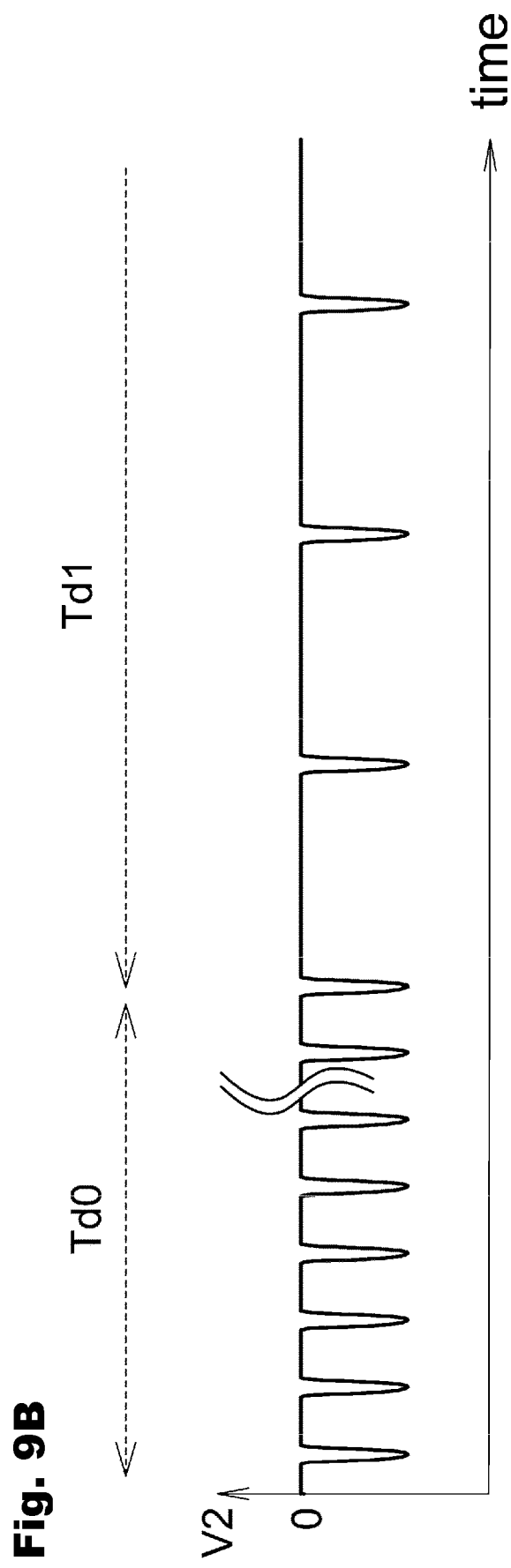

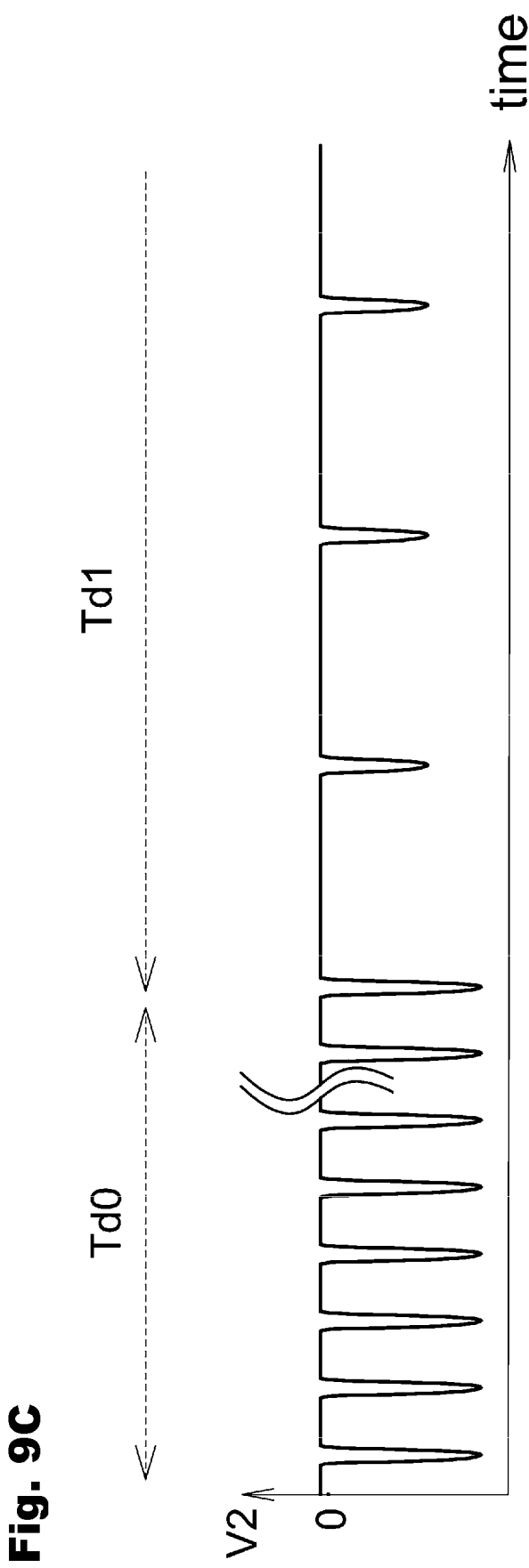

LIGHT SOURCE DEVICE, DIELECTRIC BARRIER DISCHARGE LAMP LIGHTING CIRCUIT, DIELECTRIC BARRIER DISCHARGE LAMP LIGHTING METHOD

TECHNICAL FIELD

The present invention relates to a light source device and particularly relates to a light source device including a dielectric barrier discharge lamp. The present invention also relates to a dielectric barrier discharge lamp lighting circuit and a dielectric barrier discharge lamp lighting method.

BACKGROUND ART

There is a conventionally-known technique for lighting a dielectric barrier discharge lamp by a flyback-type lighting circuit (see, for example, Patent Document 1). Such a flyback-type lighting circuit basically requires only one switching element such as an FET and therefore has the economic advantage of low cost.

PRIOR ART DOCUMENT

Patent Documents

Patent Document 1: JP-A-10-223384
Patent Document 2: JP-A-2000-92968

SUMMARY OF THE INVENTION

Problems to be Solved by the Invention

In recent years, techniques for inactivating germs and viruses using ultraviolet light have been developed. The present applicant also has developed a technique for killing germs and inactivating viruses using an excimer lamp which is a type of dielectric barrier discharge lamp (see, for example, Patent Document 2 mentioned above).

When a dielectric barrier discharge lamp is lighted to emit ultraviolet light for inactivating germs and viruses, some users may have reasons to need adjustment of the irradiance of ultraviolet light. Further, light source devices including such a dielectric barrier discharge lamp are expected to be installed in various places, and therefore in some places of installation, ultraviolet light with high irradiance may be required or, on the other hand, ultraviolet light with low irradiance may be required in terms of influence on a human body. For example, when a light source device is installed on a ceiling to emit ultraviolet light downward for inactivating germs and viruses present in a space or on the surface of an object, there is a case where the irradiance of the ultraviolet light in the space or on the surface of the object is not constant depending on the difference in the height of the ceiling so that power control is required.

However, when a dielectric barrier discharge lamp is lighted using a flyback-type lighting circuit, it is traditionally difficult to adjust the irradiance of light emitted from the dielectric barrier discharge lamp. The reason for this is as follows.

To stably light a dielectric barrier discharge lamp, it is necessary to apply a voltage optimum for the lamp. Therefore, to achieve such an optimum applied voltage, an optimum number of turns is previously set for a transformer (voltage converter) included in a flyback-type lighting circuit. Particularly, in terms of design verification, it is difficult to change a voltage transformation ratio in the lighting circuit of the dielectric barrier discharge lamp, because various parameters are influenced by changes in drive frequency and input power to the lamp.

When a dielectric barrier discharge lamp is lighted using a push-pull- or full-bridge-type lighting circuit, an applied voltage can be adjusted by changing the frequency of the ON/OFF control of a switching element. However, in the case of a flyback-type lighting circuit, it is technically difficult to perform irradiance adjustment by such a method.

In the case of a flyback-type lighting circuit, it seems likely that input power to the lamp is increased by increasing the frequency (switching frequency) of ON/OFF control of a switching element, but in fact, there is a case where the input power reduces due to a reduction in the applied voltage to the lamp. On the other hand, it seems likely that input power to the lamp is reduced by reducing the frequency, but in fact, there is a case where the input power increases due to an increase in the applied voltage to the lamp. Such circumstances are different from the design concept and thinking of a designer, which actually complicates the adjustment of lighting irradiance and leads to difficulty in the adjustment of lighting irradiance.

FIG. 1 is a circuit block diagram showing an example of the structure of a flyback-type lighting circuit for a dielectric barrier discharge lamp. A lighting circuit 90 includes a direct-current power source 21, a switching element 22, a controller 94 to perform open/close control of the switching element 22, a smoothing capacitor 25, and a transformer 30. Output terminals (b1, b2) provided in the lighting circuit 90 are connected to a dielectric barrier discharge lamp 50 as a load.

The dielectric barrier discharge lamp 50 includes a pair of electrodes (51, 52) formed on the outer surface of a light-emitting tube (not shown) made of a dielectric material, and the light-emitting tube is enclosed in a predetermined light-emitting gas. The pair of electrodes (51, 52) are connected to a secondary winding L2 of the transformer 30.

On the other hand, a primary winding L1 of the transformer 30 is connected to the direct-current power source 21 via the switching element 22. When the switching element 22 switches to an ON state, a primary current I1 flows from the direct-current power source 21 to the primary winding L1. The switching element 22 is ON/OFF controlled based on a control signal G(t) from the controller 94. It should be noted that the switching element 22 includes a parasitic diode 23. This parasitic diode 23 may be formed by connecting a separate diode in parallel to the switching element 22, or the switching element 22 may be constituted by an FET (Field-Effect Transistor) previously having a diode. In the latter case, the parasitic diode 23 shown in FIG. 1 is a part of the switching element 22 but is shown in an equivalent circuit diagram.

FIG. 2A is a timing chart schematically showing temporal changes in the control signal G(t) from the controller 94, the primary current I1 flowing through the primary winding L1 of the transformer 30, a voltage (secondary voltage) V2 between both terminals of the secondary winding L2 of the transformer 30, and a secondary current I2 flowing through the secondary winding L2 of the transformer 30. FIG. 2B is a partially-enlarged diagram of FIG. 2A.

When the control signal G(t) changes from Low to High at a time t1, the switching element 22 shifts from an OFF state to an ON state, and the primary current I1 of the transformer 30 increases as time passes. Then, when the control signal G(t) changes from High to Low at a time t2, the switching element 22 shifts from the ON state to the OFF state. At this time, a back electromotive force (EMF) is generated in the secondary winding L2 of the transformer 30, generating an impulse-type secondary voltage V2. This secondary voltage V2 is applied to the inside of the light-emitting tube of the dielectric barrier discharge lamp 50 via the pair of electrodes (51, 52) so that light Ry1 is emitted.

Having the light-emitting tube made of a dielectric material and the pair of electrodes (51, 52) sandwiching the light-emitting tube, the dielectric barrier discharge lamp 50 equivalently constitutes a capacitor element (hereinafter referred to as an "equivalent capacitor C50"). Therefore, when the secondary voltage V2 is applied, an electric charge is stored in the equivalent capacitor C50 constituted by the dielectric barrier discharge lamp 50.

With the application of the secondary voltage V2, the secondary current I2 flows through the secondary winding L2 of the transformer 30. The secondary current I2 flows while releasing energy stored in the transformer 30, and therefore reaches a zero value as time passes (time t2 to time ta).

When the release of energy stored in the transformer 30 is completed by the secondary current I2, the electric charge stored in the equivalent capacitor C50 is released. Due to such electric discharge, an electric current (secondary current I2) flows through the secondary winding L2 of the transformer 30 in a direction opposite to the previous direction so that the secondary voltage V2 changes to reach a zero value (time ta to time tb).

Even after the completion of discharge of the equivalent capacitor C50, the secondary winding L2 of the transformer 30 functions as a voltage source to continuously flow the secondary current I2 while electrically charging the equivalent capacitor C50. Then, when the flow of the secondary current I2 stops, a primary voltage V1 is induced in the primary winding L1 of the transformer 30. This induced voltage is a voltage having a reverse polarity to the direct-current power source 21. However, as described above, since the switching element 22 includes the parasitic diode 23, the primary current I1 flows through the primary winding L1 in an opposite direction via the parasitic diode 23. This current is also referred to as a "regenerative current". Such a regenerative current is generated as a result of the circumstances specific to a load constituted by the dielectric barrier discharge lamp 50.

The primary current I1 gradually approaches a zero value. However, when the switching element 22 again switches to the ON state at a time t3, the value of the primary current I1 continues to increase as in the case of the time t1 to the time t2. Then, the same phenomenon repeats.

Here, a study is made about a case where the frequency of the control signal G(t) is reduced to increase the ON/OFF switching period of the switching element 22. As shown in the timing chart of FIG. 2A, the primary current I1 of the transformer 30 increases as time passes after the switching element 22 switches from the OFF state to the ON state. The slope of the upward curve of this current depends on the inductance value of the primary winding L1 of the transformer 30 and an applied voltage (secondary voltage V2) to the transformer 30.

Increasing the ON/OFF switching period of the switching element 22 means that the ON time of the switching element 22 becomes long. Considering FIG. 2A, the value of the primary current I1 continues to increase during the ON state of the switching element 22. Therefore, when the ON time of the switching element 22 becomes long, the value of the primary current I1 just before the switching of the switching element 22 from the ON state to the OFF state (the positive peak value of the primary current I1 in FIG. 2A and FIG. 2B) becomes high.

Inductive energy generated on the secondary winding L2 side of the transformer 30 when the switching element 22 switches from the ON state to the OFF state is proportionate to the product of the inductance value of the primary winding L1 of the transformer 30 and the square of the primary current I1. This means that when the ON/OFF switching period of the switching element 22 increases, the electric power input to the dielectric barrier discharge lamp 50 connected to the secondary winding L2 of the transformer 30 increases. As a result, the irradiance of the light Ry1 emitted from the dielectric barrier discharge lamp 50 cannot be reduced.

In other words, in order to reduce the irradiance of the light Ry1 emitted from the dielectric barrier discharge lamp 50 by reducing the frequency of the control signal G(t), the slope of the upward curve of the primary current I1 of the transformer 30 needs to be made gentle. However, as described above, since the slope of the upward curve of the primary current I1 of the transformer 30 depends on the inductance value of the primary winding L1 of the transformer 30, the transformer 30 needs to be replaced to change the slope, which is not practical.

On the other hand, when the ON/OFF switching period of the switching element 22 is reduced by increasing the frequency of the control signal G(t), the frequency of application of a high voltage to the dielectric barrier discharge lamp 50 within a certain time increases, and therefore it is still difficult to reduce the irradiance.

Given the above circumstances, it is an object of the present invention to make it possible to appropriately adjust the irradiance of a dielectric barrier discharge lamp when the dielectric barrier discharge lamp is lighted by a flyback-type lighting circuit. That is, it is an object of the present invention to provide a light source device including a dielectric barrier discharge lamp whose lighting control is performed by a flyback-type lighting circuit and whose irradiance can be adjusted. It is also an object of the present invention to provide a circuit and a method for lighting such a dielectric barrier discharge lamp.

Means for Solving the Problems

The present invention is directed to a light source device including a dielectric barrier discharge lamp and a lighting circuit for lighting the dielectric barrier discharge lamp, wherein the lighting circuit includes:
  a direct-current power source,
  a transformer having a primary winding connected to the direct-current power source and a secondary winding connected to the dielectric barrier discharge lamp,
  a closed circuit in which the direct-current power source, the primary winding, and a switching element including a parasitic diode are serially connected, and
  a controller to perform ON/OFF control of the switching element, and wherein
the controller executes:
  a first step to shift the switching element from an ON state to an OFF state, and
  a second step to shift the switching element from the OFF state to the ON state after a lapse of a predetermined OFF holding time from when a regenerative current flowing through the primary winding reaches a zero value after the first step.

As described above in the section "PROBLEMS TO BE SOLVED BY THE INVENTION", since there is a suitable applied voltage for lighting the dielectric barrier discharge lamp, it is practically difficult to change the applied voltage for irradiance adjustment. A voltage applied to the dielectric barrier discharge lamp corresponds to a voltage derived from back electromotive force induced in the secondary winding of the transformer due to the shift of the switching element from the ON state to the OFF state, and this voltage depends on an electric current (primary current) flowing through the primary winding of the transformer at the time when the switching element shifts from the ON state to the OFF state.

In the case of the configuration described above, the timing of execution of the second step to shift the switching element from the OFF state to the ON state is after the time when the regenerative current reaches a zero value. The primary current of the transformer starts to increase from a zero value after the execution of the second step and continuously increases until the switching element again shifts to the OFF state (during an ON time).

That is, an applied voltage to the dielectric barrier discharge lamp can be maintained at a substantially constant value by, for example, maintaining the ON time substantially constant. Further, the ON/OFF duty ratio of the switching element can be adjusted by shifting the switching element from the OFF state to the ON state after a lapse of a predetermined OFF holding time from when the primary current of the transformer reaches a zero value.

For example, by increasing the ratio (duty ratio) of the ON time to the total of the ON time and the OFF time, an impulse-type voltage is applied to the dielectric barrier discharge lamp in a unit of time more frequently, so that the amount of input energy increases. As a result, the irradiance of light emitted from the dielectric barrier discharge lamp increases. On the other hand, the duty ratio should be reduced when the irradiance needs to be reduced.

The duty ratio should be adjusted by adjusting the time from when the primary current of the transformer reaches a zero value to when control to shift the switching element from the OFF state to the ON state (second step) is executed, that is, by adjusting the OFF holding time. That is, such control makes it possible to adjust the irradiance of light emitted from the dielectric barrier discharge lamp without adjusting the ON time of the switching element. As a result, the irradiance can be adjusted while stable lighting of the dielectric barrier discharge lamp is achieved.

For example, even when the same type of dielectric barrier discharge lamp is used, a light source device with relatively low irradiance and a light source device with relatively high irradiance can be achieved by previously setting different values of the OFF holding time by the controller.

The controller may execute the second step after ringing of a voltage value between both terminals of the secondary winding of the transformer substantially converges.

As described above, the controller of the lighting circuit executes the second step to shift the switching element from the OFF state to the ON state after a lapse of a predetermined OFF holding time from when the regenerative current flowing through the transformer reaches a zero value. That is, there is a waiting time from when the primary current (regenerative current) of the transformer reaches a zero value to when the switching element shifts from the OFF state to the ON state.

However, even after the regenerative current of the transformer reaches a zero value, part of the energy is still stored in the transformer. As a result, a resonance phenomenon is caused by an LC resonance circuit constituted by the secondary winding of the transformer and a capacitor component included in the dielectric barrier discharge lamp as a load so that a voltage (secondary voltage) between both terminals of the secondary winding of the transformer fluctuates. However, resistance components derived from the dielectric barrier discharge lamp and the secondary winding of the transformer are present in the LC resonance circuit, and therefore the value of the secondary voltage gradually decays. That is, the secondary voltage shows a ringing waveform that decays while oscillating.

If the switching element shifts from the OFF state to the ON state in a time period when ringing is occurring, ringing occurs in a voltage between both terminals of the switching element. A voltage change caused by ringing varies, and therefore if the switching element shifts from the OFF state to the ON state in this time period, the consistency of excitation energy supplied to the transformer may be impaired. As a result, there is a case where the secondary voltage of the transformer fluctuates so that the dielectric barrier discharge lamp causes flicker lighting.

The configuration described above makes it possible to stabilize the applied voltage to the dielectric barrier discharge lamp because the second step is executed after the ringing of the secondary voltage substantially converges.

The "ringing of the secondary voltage substantially converges" herein refers to a case where the fluctuation range of the secondary voltage from 0 V is 10% or less, preferably 5% or less of the peak value of the secondary voltage.

The controller may be configured to be able to change the OFF holding time.

Such a configuration makes it possible to adjust the irradiance even when the light source device is the same. This effect is remarkably exhibited particularly when the dielectric barrier discharge lamp is an excimer lamp that emits ultraviolet light.

For example, when a light-emitting gas contains KrCl, the excimer lamp emits ultraviolet light having a main peak wavelength of about 222 nm. Further, for example, when the light-emitting gas contains KrBr, the excimer lamp emits ultraviolet light having a main peak wavelength of about 207 nm. Unlike ultraviolet light emitted from a low-pressure mercury lamp and containing a component of a wavelength of 254 nm, ultraviolet light having a main peak wavelength of 200 nm or more and 240 nm or less is absorbed by the stratum corneum of the skin and does not proceed to the inside of the stratum corneum (basal layer side) even when applied to a human body, and therefore the risk of DNA damage caused by absorption by cells is low. Therefore, the excimer lamp can be used for inactivating germs and viruses in a space where a human may be present.

Although the influence of ultraviolet light emitted from the excimer lamp on a human body is much lower than that of ultraviolet light emitted from a low-pressure mercury lamp, it is conceivable that some users wish to avoid long-time irradiation of a human body with ultraviolet light emitted from the excimer lamp at high irradiance. Further, as will be described later, at the time of filing this application for patent, it is recommended that the integrated irradiation dose of ultraviolet light applied to a human body be equal to or less than a regulation value specified by the American Conference of Governmental Industrial Hygienists (ACGIH).

For example, such an excimer lamp that emits ultraviolet light may actually be installed on a ceiling. In this case, when the excimer lamp is installed on a relatively high ceiling, a sufficient distance to a human body is kept so that an integrated irradiance is low, but when the excimer lamp is installed on a relatively low ceiling, the distance to a human body is short so that an integrated irradiance is high. In order to operate the excimer lamp at high irradiance in an environment where the distance to a human body is short, it is necessary to repeat turning-on and turning-off in a ratio appropriate to achieve a predetermined integrated irradiance (e.g., 10-second turning-on, 300-second turning-off). In the case of such a method, killing or inactivation of germs is not performed during a turn-off time period of 300 seconds so that the risk of infection remains during that time period.

Therefore, in such a case, the irradiance of emitted ultraviolet light is preferably reduced during the operation of the excimer lamp. The configuration described above makes it possible to light the excimer lamp at low irradiance, and therefore the risk of infection can further be reduced by continuously irradiating a human body with ultraviolet light for a longer time without influence on the human body.

Further, the configuration described above makes it possible to adjust the irradiance of the excimer lamp, and therefore it is possible to change the irradiance between, for example, a time period when a human is present in an irradiation space and a time period when a human is absent in the irradiation space. This makes it possible to inactivate germs and viruses while influence on a human body is taken into consideration.

It should be noted that the "inactivate" herein refers to a concept including killing germs and viruses or depriving germs and viruses of their infectious power and toxicity, and the "germs" herein refers to microorganisms such as bacteria and fungi (molds).

The controller may repeatedly execute the first step and the second step. For example, the time from the end of execution of the first step to the start of execution of the second step (OFF period) may be 5 to 300 µs, and the time from the end of execution of the second step to the start of execution of the first step (ON period) may be 1 to 10 µs. In this way, the steps are preferably repeatedly executed so that the OFF period is longer than the ON period.

In this case, in a time period when the first step and the second step are repeatedly executed, each of the first steps may be executed after a lapse of substantially a same ON holding time after a last second step is executed.

Such a configuration makes it possible to make the magnitude of the secondary voltage of the transformer substantially constant which is generated by the shift of the switching element from the ON state to the OFF state due to the execution of the first step. This makes it possible to maintain the applied voltage to the dielectric barrier discharge lamp at a substantially constant value, thereby maintaining a stable lighting state.

The "substantially a same ON holding time" herein refers to a case where the fluctuation range of the ON holding time is 10% or less, preferably 5% or less of the maximum value of the ON holding time.

The controller may have, in a time period when the first step and the second step are repeatedly executed, a standard control mode in which the first step is executed after a lapse of substantially a same first ON holding time after a last second step is executed and a special control mode in which the first step is executed after a lapse of a second ON holding time longer than the first ON holding time after a last second step is executed, wherein an execution frequency of the special control mode may be lower than that of the standard control mode.

As described above, the controller executes the second step to shift the switching element from the OFF state to the ON state after a lapse of a predetermined OFF holding time from when the regenerative current reaches a zero value. Therefore, when the OFF holding time is set to be long, plasma generated in a light-emitting tube of the dielectric barrier discharge lamp by the last voltage application may disappear or decay. In such a state, there is a possibility that the dielectric barrier discharge lamp does not continue to light and goes out even when an impulse-type voltage (secondary voltage) that is the same as the last one is applied to the dielectric barrier discharge lamp.

The configuration described above makes it possible, by temporarily increasing the time when the ON state of the switching element is maintained (ON holding time), to temporarily increase the voltage applied to the dielectric barrier discharge lamp when the switching element shifts to the OFF state after that. As a result, even when the OFF holding time is set to be long and the plasma in the light-emitting tube of the dielectric barrier discharge lamp disappears or decays, radicals can be generated by exciting atoms contained in the light-emitting gas so that a stable light-emitting state can continue.

It should be noted that the execution frequency of the special control mode may be much lower than that of the standard control mode. Specifically, the total time of the time periods when the special control mode is executed is preferably 10% or less, more preferably 3% or less of the total time of the time periods when the standard control mode is executed.

The controller may have a standard control mode in which the first step is executed after a lapse of substantially a same first ON holding time after a last second step is executed and a special control mode in which a switching frequency between the ON state and the OFF state is higher than that in the standard control mode, wherein the special control mode is a control mode inserted between the standard control modes, and an execution frequency of the special control mode may be lower than that of the standard control mode.

By increasing the switching frequency, energy applied to the dielectric barrier discharge lamp in a unit of time is increased. As a result, even when the OFF holding time is set to be long and the plasma in the light-emitting tube of the dielectric barrier discharge lamp disappears or decays, radicals can be generated by exciting atoms contained in the light-emitting gas so that a stable light-emitting state can continue. Further, it is also possible to obtain a secondary effect that the glass distortion of the lamp is reduced by regularly applying high electric power to prevent breakage of the lamp.

The controller may execute the special control mode at least at start-up before lighting of the dielectric barrier discharge lamp starts.

The configuration described above makes it possible to increase the applied voltage to the dielectric barrier discharge lamp or the frequency of pulse voltage application as compared to a steady state at the start of lighting (start-up), and therefore the effect of improving the start-up performance of the dielectric barrier discharge lamp can be expected.

The present invention is also directed to a lighting circuit for lighting a dielectric barrier discharge lamp, including
a direct-current power source,
a transformer having a primary winding connected to the direct-current power source and a secondary winding connected to the dielectric barrier discharge lamp,
a closed circuit in which the direct-current power source, the primary winding, and a switching element including a parasitic diode are serially connected, and
a controller to perform ON/OFF control of the switching element, wherein
the controller executes:
a first step to shift the switching element from an ON state to an OFF state and
a second step to shift the switching element from the OFF state to the ON state after a lapse of a predetermined OFF holding time from when a regenerative current flowing through the primary winding reaches a zero value after the first step.

The present invention is also directed to a dielectric barrier discharge lamp lighting method using a lighting circuit,
the lighting circuit including
a direct-current power source,
a transformer having a primary winding connected to the direct-current power source and a secondary winding connected to the dielectric barrier discharge lamp, and
a closed circuit in which the direct-current power source, the primary winding, and a switching element including a parasitic diode are serially connected,
the method including
a first step to shift the switching element from an ON state to an OFF state and
a second step to shift the switching element from the OFF state to the ON state after a lapse of a predetermined OFF holding time from when a regenerative current flowing through the primary winding reaches a zero value after the first step.

Effect of the Invention

The present invention makes it possible to appropriately adjust the irradiance of a dielectric barrier discharge lamp even by using a flyback-type lighting circuit.

BRIEF DESCRIPTION OF THE DRAWINGS

FIG. 8A is a timing chart schematically showing temporal changes in a control signal G(t) and a secondary voltage V2 when switching control is performed using a lighting circuit according to another embodiment of the present invention.

FIG. 8B is a timing chart schematically showing a temporal change in a secondary voltage V2 when switching control is performed using a lighting circuit according to another embodiment of the present invention.

FIG. 9A is a timing chart schematically showing a temporal change in a secondary voltage V2 when switching control is performed using a lighting circuit according to another embodiment of the present invention.

FIG. 9B is a timing chart schematically showing a temporal change in a secondary voltage V2 when switching control is performed using a lighting circuit according to another embodiment of the present invention.

FIG. 9C is a timing chart schematically showing a temporal change in a secondary voltage V2 when switching control is performed using a lighting circuit according to another embodiment of the present invention.

MODE FOR CARRYING OUT THE INVENTION

A dielectric barrier discharge lamp lighting circuit, a dielectric barrier discharge lamp lighting method, and a light source device according to an embodiment of the present invention will be described below regarding the drawings. It should be noted that the same reference signs are used for elements common to FIG. 1 and the description of the elements will be simplified or omitted.

[Structure]

Figure 3:
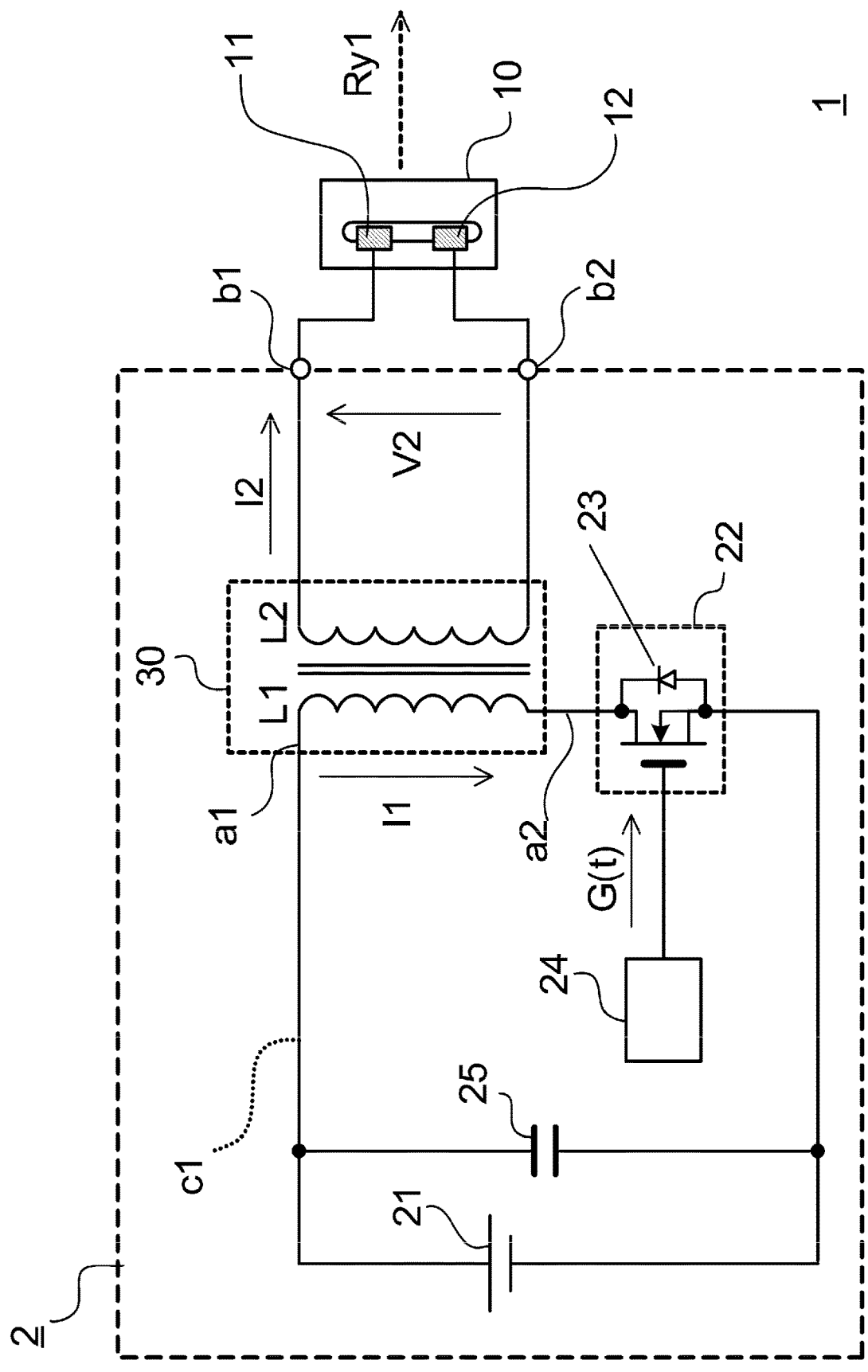
FIG. 3 is a block diagram schematically showing the structure of a light source device according to the present invention.

FIG. 3 is a block diagram schematically showing the structure of a light source device according to the present invention. A light source device 1 includes a dielectric barrier discharge lamp 10 and a lighting circuit 2 to drive and light the dielectric barrier discharge lamp 10. As shown in FIG. 3, the lighting circuit 2 includes a closed circuit c1 in which a direct-current power source 21, a primary winding L1 of a transformer 30, and a switching element 22 are serially connected.

(Dielectric Barrier Discharge Lamp 10)

Figure 4A:
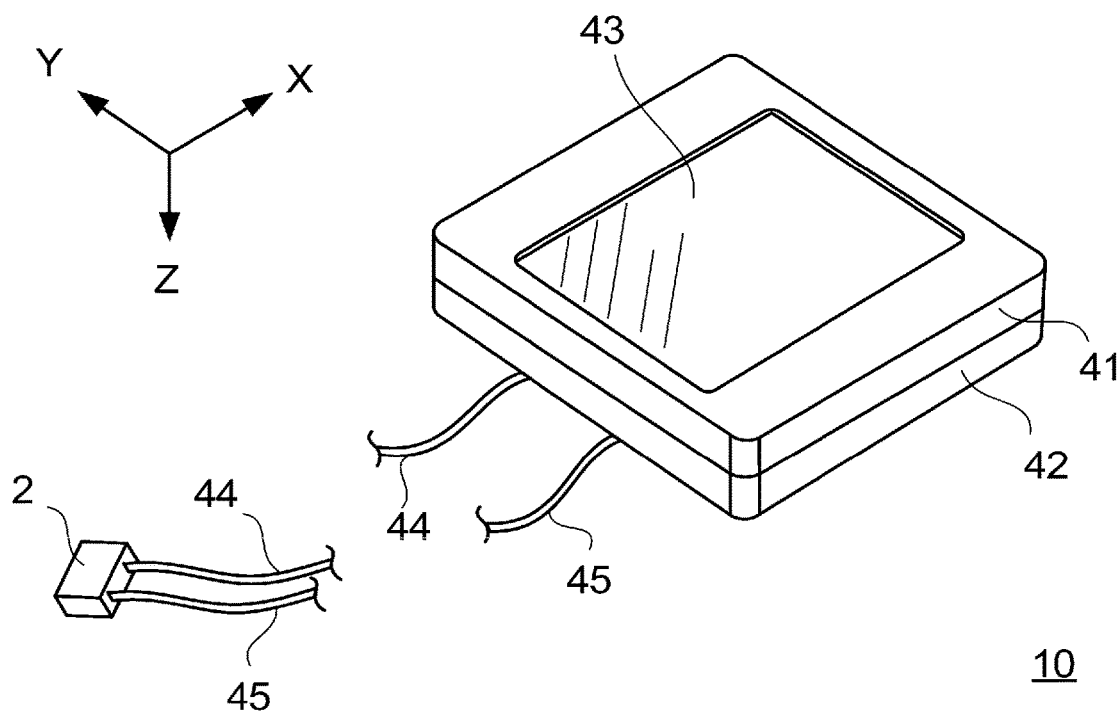
FIG. 4A is a perspective view schematically showing an example of the external appearance of a dielectric barrier discharge lamp.
Figure 4B:
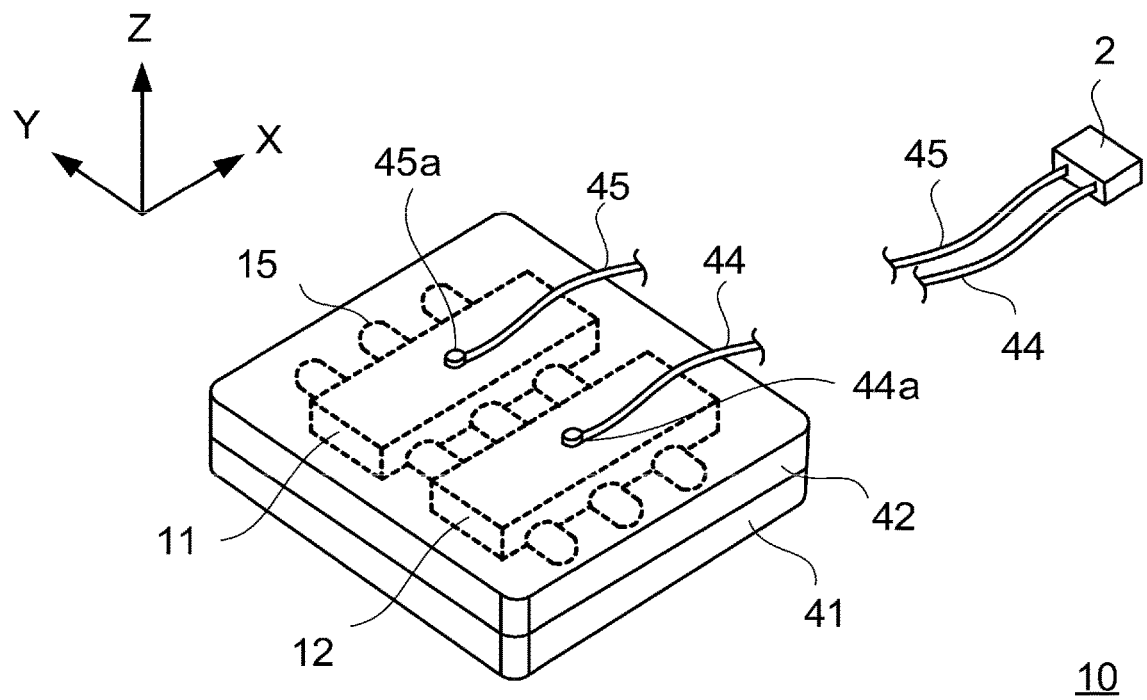
FIG. 4B is a perspective view schematically showing an example of the external appearance of the dielectric barrier discharge lamp shown in FIG. 4A from which some elements are removed.

FIG. 4A and FIG. 4B are perspective views schematically showing the external appearance of the dielectric barrier discharge lamp 10. However, the structure shown in FIG. 4A and FIG. 4B is merely an example, and the dielectric barrier discharge lamp 10 of the light source device 1 according to the present invention can have any structure.

As shown in FIG. 4A, the dielectric barrier discharge lamp 10 includes a cover 41 having a light extraction surface 43 formed in one of surfaces thereof and a main body casing 42. FIG. 4B is a schematic view of the dielectric barrier discharge lamp 10 shown in FIG. 4A in which part of the cover 41 is not shown. In the example shown in FIG. 4B, the dielectric barrier discharge lamp 10 includes a plurality of light-emitting tubes 15 and electrodes (11, 12) for applying a voltage to the light-emitting tubes 15. The electrodes (11, 12) are connected to power wires (44, 45) via junctions (44a, 45a), respectively. The power wires (44, 45) are connected to the lighting circuit 2.

The light-emitting tubes 15 are made of a dielectric material such as quartz glass and are enclosed in a predetermined light-emitting gas. When a high-frequency voltage of, for example, about 1 kHz to 5 MHz is applied to the electrodes (11, 12), the voltage is applied to the light-emitting gas via the light-emitting tubes 15. At this time, discharge plasma is generated in a discharge space filled with the light-emitting gas, and atoms of the light-emitting gas are excited to the excimer state so that excimer light is emitted when the atoms are transferred to the ground state.

The wavelength of light Ry1 emitted from the dielectric barrier discharge lamp 10 is determined depending on a substance contained in the light-emitting gas enclosed in the dielectric barrier discharge lamp 10. For example, when the light-emitting gas contains KrCl, the light Ry1 emitted from the dielectric barrier discharge lamp 10 shows a spectrum having a main peak wavelength of about 222 nm. When the light-emitting gas contains KrBr, the light Ry1 shows a spectrum having a main peak wavelength of about 207 nm. When the light-emitting gas contains ArF, the light Ry1 shows a spectrum having a main peak wavelength of about 193 nm. However, in the present invention, the type of gas to be filled in the light-emitting tubes 15 of the dielectric barrier discharge lamp 10 is not particularly limited and may be appropriately selected depending on a desired wavelength of the light Ry1. Further, to shift the wavelength to a longer wavelength side, a fluorescent material may be applied onto the tube walls of the light-emitting tubes 15 or the light extraction surface 43.

(Lighting Circuit 2)

Figure 1:
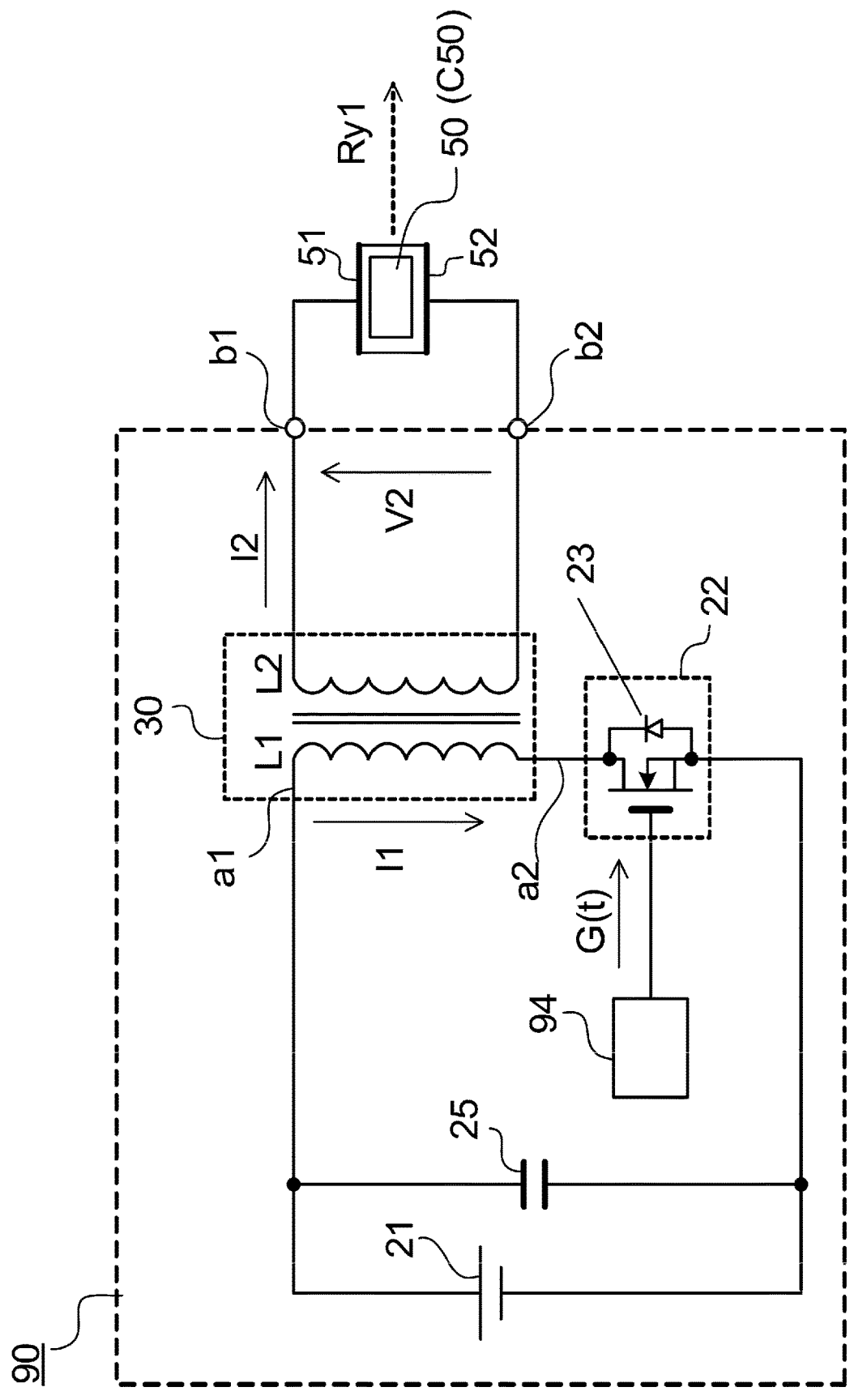
FIG. 1 is a circuit block diagram showing an example of the structure of a flyback-type lighting circuit for a dielectric barrier discharge lamp.

The lighting circuit 2 shown in FIG. 3 is a flyback-type circuit and is substantially in common with the lighting circuit 90 shown in FIG. 1. That is, the lighting circuit 2 includes a direct-current power source 21, a switching element 22 having a regenerative capability, and a transformer 30. The transformer 30 includes a primary winding L1 and a secondary winding L2. The primary winding L1 of the transformer 30 includes a first terminal a1 and a second terminal a2. The first terminal a1 is connected to a positive electrode-side terminal of the direct-current power source 21. The second terminal a2 is connected to a negative electrode-side terminal of the direct-current power source 21 via the switching element 22. The regenerative capability of the switching element 22 is achieved by, for example, including a parasitic diode 23.

The direct-current power source 21 may be constituted by, for example, an AC/DC converter to perform AC/DC conversion of a commercial power source not shown. The lighting circuit 2 includes a smoothing capacitor 25 to smoothen a voltage waveform. The direct-current power source 21 may be constituted by a battery.

The lighting circuit 2 according to the present embodiment includes a controller 24 to perform ON/OFF control on the switching element 22. The controller 24 provides different control over the switching element 22 from the controller 94 of the lighting circuit 90. Hereinbelow, the contents of the control performed by the controller 24 will be described with reference to a timing chart.

Figure 5:
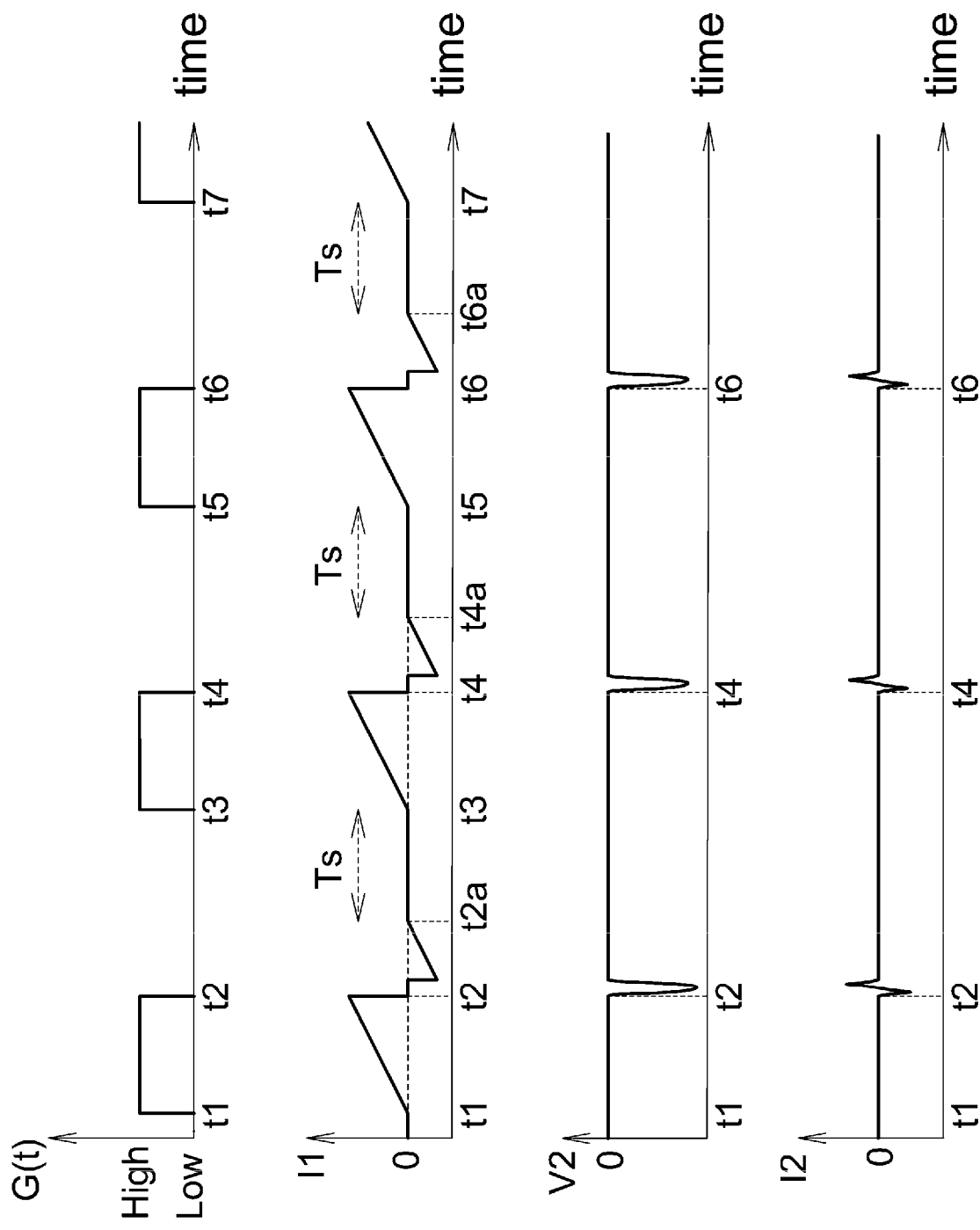
FIG. 5 is a timing chart schematically showing temporal changes in a control signal G(t), a primary current I1, a secondary voltage V2, and a secondary current I2 when switching control is performed using a lighting circuit according to an embodiment of the present invention.

FIG. 5 is a timing chart schematically showing, in the same manner as in FIG. 2, temporal changes in a control signal G(t) from the controller 24, a primary current I1 flowing through the primary winding L1 of the transformer 30, a voltage (secondary voltage) V2 between both terminals of the secondary winding L2 of the transformer 30, and a secondary current I2 flowing through the secondary winding L2 of the transformer 30 in the lighting circuit 2 according to the present embodiment.

Figure 2A:
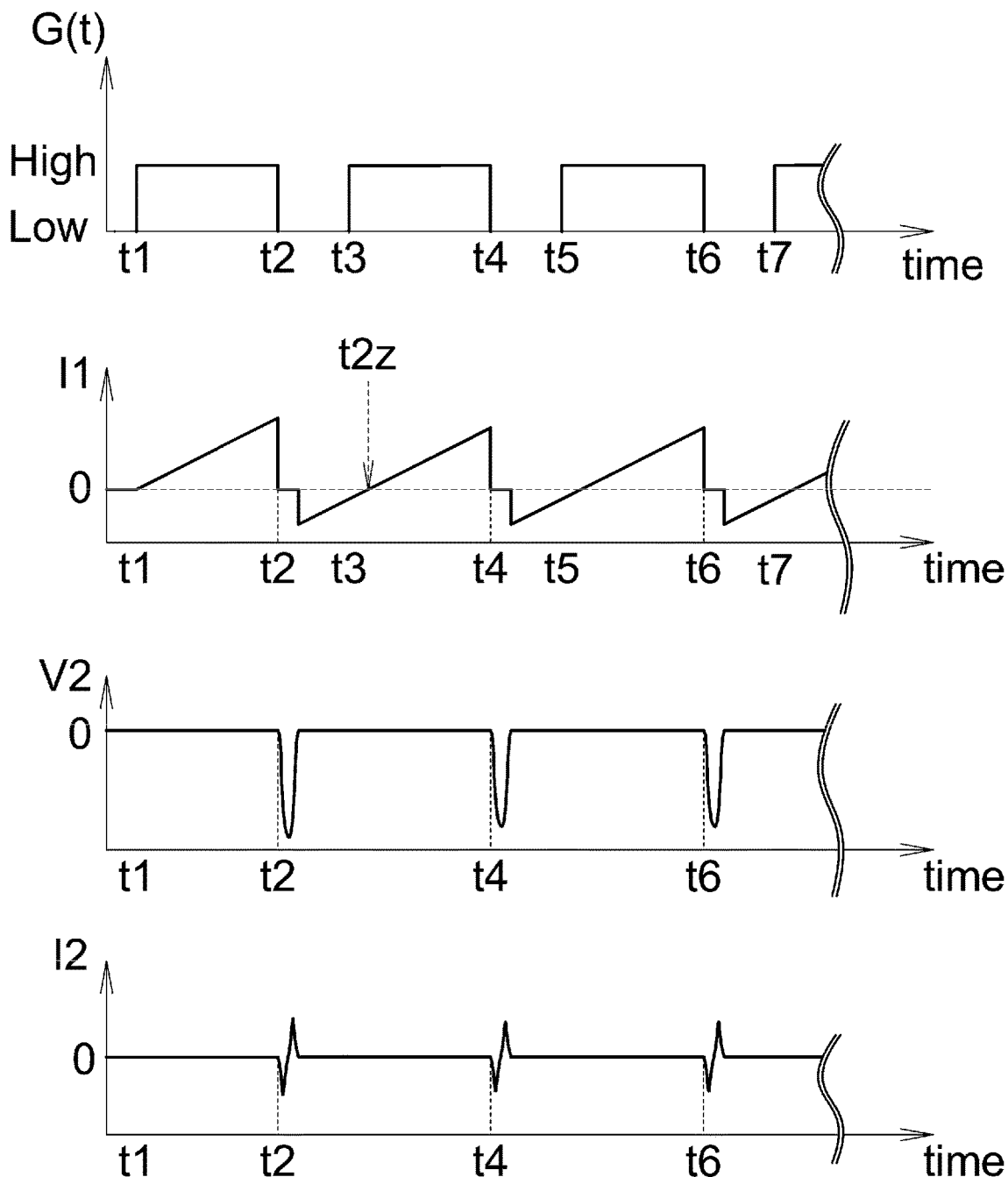
FIG. 2A is a timing chart schematically showing temporal changes in a control signal G(t), a primary current I1, a secondary voltage V2, and a secondary current I2 when general switching control is performed using a flyback-type lighting circuit.

According to the timing chart shown in FIG. 2A, the controller 94 of the lighting circuit 90 shifts the switching element 22 from the OFF state to the ON state before the time point when the primary current I1 (regenerative current) reaches a zero value during a regenerative operation. Specifically, for example, in FIG. 2A, the time t3 when the switching element 22 shifts from the OFF state to the ON state is before a time t2z when the primary current I1 reaches a zero value during a regenerative operation.

On the other hand, as shown in FIG. 5, the controller 24 of the lighting circuit 2 according to the present embodiment performs control to shift the switching element 22 from the OFF state to the ON state after a lapse of a predetermined time (hereinafter referred to as an "OFF holding time Ts") after the primary current I1 reaches a zero value. It should be noted that control to shift the switching element 22 from the ON state to the OFF state (e.g., control at times t2, t4, and t6) corresponds to a "first step", and control to shift the switching element 22 from the OFF state to the ON state (e.g., control at times t1, t3, t5, and t7) corresponds to a "second step".

Heretofore, it was not intended to adjust the irradiance of a dielectric barrier discharge lamp. Further, from the viewpoint of reducing heat generated by the switching element 22 installed in a power source circuit to save power consumption and enhance power efficiency, the switching element 22 was designed to perform synchronous rectification by shortening the OFF time of the switching element 22. Therefore, as described above with reference to FIG. 2A, zero voltage switching (ZVS) was heretofore achieved by shifting the switching element 22 from the OFF state to the ON state at a time point before the primary current I1 reached a zero value.

On the other hand, in the case of the lighting circuit 2 according to the present embodiment, the timing to shift the switching element 22 from the OFF state to the ON state is delayed by intentionally providing an OFF holding time Ts. More specifically, as shown in FIG. 5, the controller 24 changes the control signal G(t) from Low to High at the time t3 after a time t2a when the primary current I1 (regenerative current) reaches a zero value during a regenerative operation so that the switching element 22 shifts from the OFF state to the ON state. As a result, the frequency of application of a high voltage (secondary voltage V2) to the dielectric barrier discharge lamp 10 in a unit of time reduces so that the irradiance of the light Ry1 reduces. The irradiance of the light Ry1 can be adjusted by appropriately adjusting the OFF holding time Ts. That is, the irradiance of the light Ry1 can be adjusted by making the OFF holding time in a microsecond-scale (1000 μs or less) short lighting period variable. This also makes it possible to adjust the amount of the light Ry1 (amount of ultraviolet light) emitted from the dielectric barrier discharge lamp 10 without depending on second-scale ON/Off control. Further, this method reduces the ON/OFF switching frequency of the switching element 22, which alleviates a problem of power loss in the switching element 22.

The following Table 1 shows the result of comparison of input voltage (secondary voltage V2), input current (secondary current I2), and input power to the dielectric barrier discharge lamp 10 and irradiance when the control signal G(t) is input to the switching element 22 from the controller 24 under the same conditions except for changing the OFF holding time Ts.

It should be noted that this validation used the dielectric barrier discharge lamp 10 shown in FIG. 4A and FIG. 4B. The details of the dielectric barrier discharge lamp 10 are as follows.

Light-emitting tubes 15: made of quartz glass, size: diameter Φ6.1 mm×length 70 mm, number of light-emitting tubes: 4
Principal light-emitting gas: KrCl
Light extraction surface 43: rectangular shape, size: 60 mm×45 mm
Voltage of direct-current power source 21: 500 V

TABLE 1

|  | Mode #1 | Mode #2 | Mode #3 | Mode #4 |
|---|---|---|---|---|
| ON time [μs] | 7.14 | 7.14 | 7.14 | 7.14 |
| OFF time [μs] | 7.14 | 12.86 | 26.19 | 59.52 |
| Period [μs] | 14.28 | 20.00 | 33.33 | 59.52 |
| Frequency [kHz] | 70 | 50 | 30 | 15 |
| Secondary voltage V2 [kV] | 4.2 | 4.22 | 4.26 | 4.28 |
| Secondary current I2 [mA] | 468 | 407 | 219 | 139 |
| Input power [W] | 11.2 | 9.8 | 5.3 | 3.3 |
| Irradiance (mW/cm$^2$) | 2.82 | 2.40 | 1.24 | 0.57 |

Modes #1 to #4 correspond to cases that are made different from each other in the length ratio of the OFF time to the ON time of the switching element 22 by adjusting the value of the OFF holding time Ts set by the controller 24. It should be noted that in all the modes, a common ON time of 7.14 μs was set.

It should be noted that the "period" in Table 1 corresponds to the time until the switching element 22 shifts from the OFF state to the ON state again after switching from the OFF state to the ON state. The frequency is the reciprocal of the period.

As can be seen from the result shown in Table 1, the values of the secondary voltage V2 are within substantially the same range even when the OFF time of the switching element 22 is changed. That is, it is understood that an applied voltage at which the dielectric barrier discharge lamp 10 can stably be lighted can be maintained.

Further, it is understood that the irradiance reduces in the order of the mode #1, the mode #2, the mode #3, and the mode #4. That is, it is confirmed that the irradiance can be reduced by increasing the OFF holding time Ts, and on the other hand, the irradiance can be increased by reducing the OFF holding time Ts.

Particularly, the ON/OFF switching frequency of the switching element 22 per unit of time is reduced by providing the OFF holding time Ts to increase the switching period as in the case of the present embodiment. As a result, heat generated by the switching element 22 is reduced, which produces a secondary effect that a cooling system can be made lighter and smaller.

Figure 6:
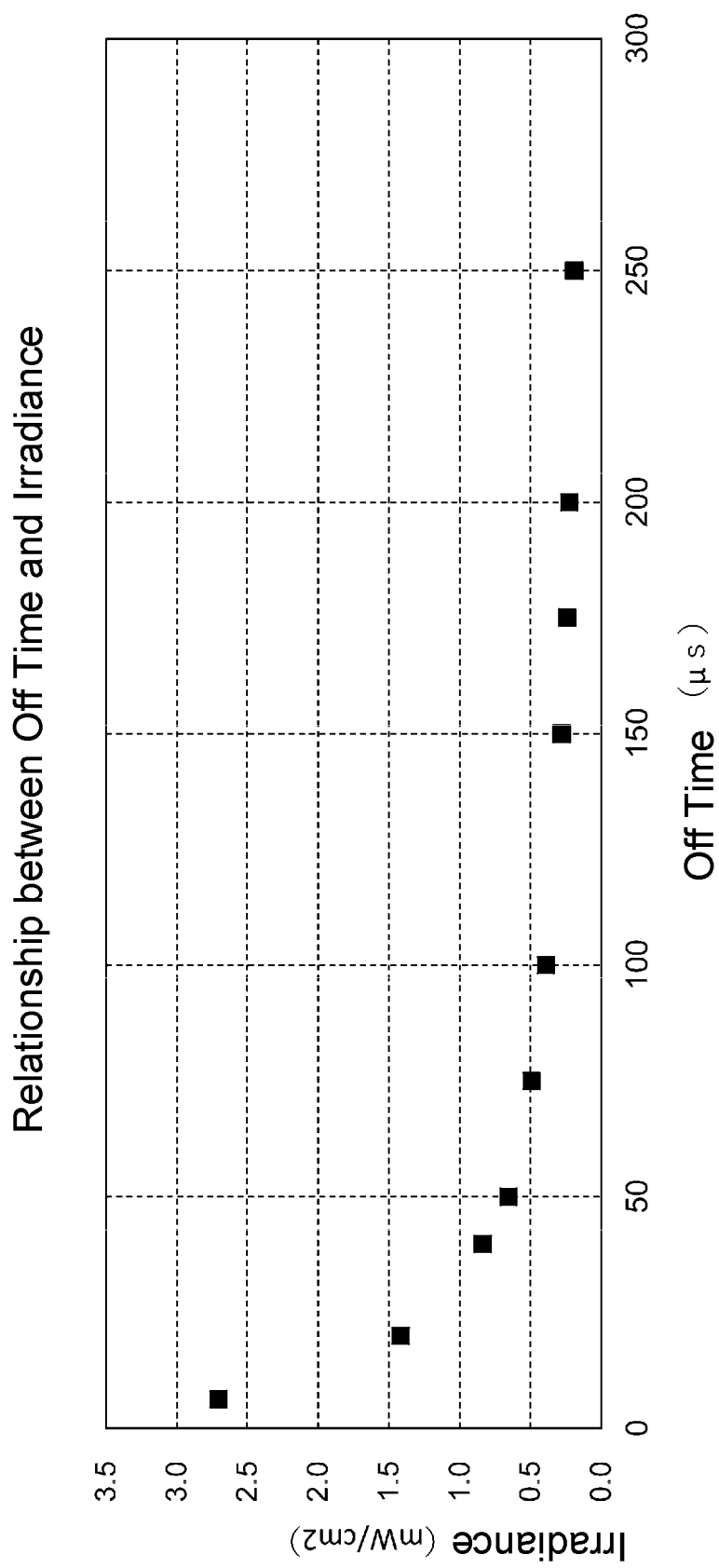
FIG. 6 is a graph showing a relationship between the irradiance of light Ry1 emitted from the dielectric barrier discharge lamp and an OFF time.

FIG. 6 is a graph showing the relationship between the irradiance of the light Ry1 emitted from the dielectric barrier discharge lamp 10 and the OFF time when the dielectric barrier discharge lamp 10 is lighted under different conditions of the OFF time while the ON time is fixed to a value (6.3 μs) different from that shown in Table 1. The irradiance of the light Ry1 was measured by an irradiance meter placed 50 cm away from the dielectric barrier discharge lamp 10.

It is understood from FIG. 6 that the irradiance of the light Ry1 reduces as the OFF time increases. This result has the same tendency as the result shown in Table 1 in which the ON time is fixed to a different value.

It should be noted that in the case of actual operation, for example, the light source device 1 may be configured so that a "high irradiance mode" and a "low irradiance mode" can be set for the dielectric barrier discharge lamp 10. In this case, the "high irradiance mode" and the "low irradiance mode" may be switchable by setting a different OFF time while setting an ON time common to both of the modes. More specifically, for example, in the case of the "low irradiance mode", the ON time is set to 5 μs and the OFF time is set to 200 μs, and on the other hand, in the case of the "high irradiance mode", the ON time is set to 5 μs and the OFF time is set to 10 μs. It should be noted that the irradiance may be set at two or more different levels. For example, in the case of the example shown in Table 1, the dielectric barrier discharge lamp 10 whose irradiance can be adjusted to 4 different levels is achieved.

Meanwhile, when the light source device 1 is used to inactivate germs and viruses, the wavelength of the light Ry1 emitted from the dielectric barrier discharge lamp 10 is in the ultraviolet light range. As described above, the dielectric barrier discharge lamp including the light-emitting tube 15 enclosed with a light-emitting gas containing KrCl or KrBr emits light Ry1 having a main peak wavelength in the range of 200 nm or more and 240 nm or less. It is said that this wavelength range hardly creates a risk of DNA damage, unlike ultraviolet light of a wavelength of 254 nm emitted from a low-pressure mercury lamp. However, at the time of filing this application for patent, restrictions are imposed on the use of ultraviolet light in a space where a human is present even in the case of this wavelength range, and it is recommended that the integrated irradiation dose of ultraviolet light be equal to or less than a regulation value specified by ACGIH.

Figure 2B:
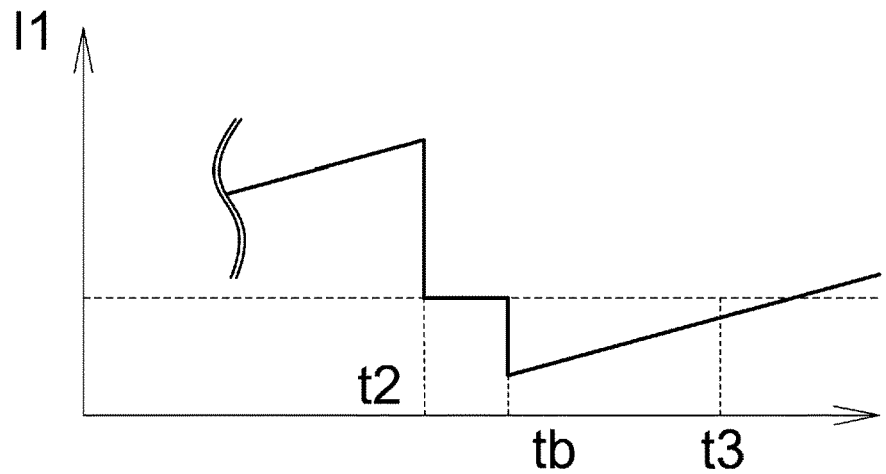
FIG. 2B is a partially enlarged diagram of FIG. 2A.
Figure 2B:
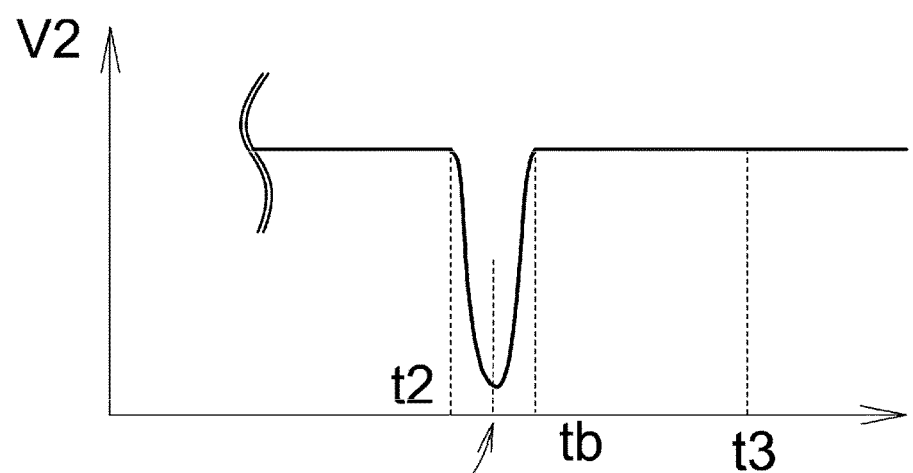
Figure 2B:
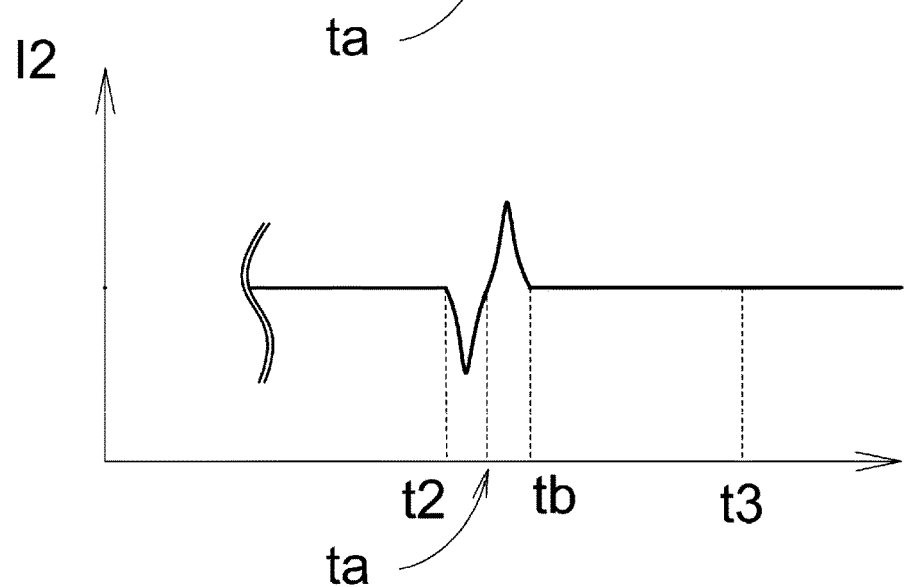

In order to satisfy this regulation value using the control method described with reference to FIG. 2A and FIG. 2B, for example, it is necessary to perform control so that the dielectric barrier discharge lamp 50 is turned on for 10 seconds and then turned off for 300 seconds. In other words, the dielectric barrier discharge lamp 50 is set to repeat turning-on and turning-off so that the integrated irradiation dose is equal to or less than the regulation value.

On the other hand, the control method according to the present embodiment described with reference to FIG. 5 makes it possible to adjust the irradiance itself of the light Ry1 emitted from the dielectric barrier discharge lamp 10 by adjusting the OFF holding time Ts. Therefore, a longer lighting time can be set by, for example, setting a longer OFF holding time Ts. In some cases, the regulation value specified by ACGIH can be satisfied even when the dielectric barrier discharge lamp 10 is lighted at all times. This makes it possible to enhance the function of inactivating germs and viruses.

Further, depending on the type of light-emitting gas enclosed in a dielectric barrier discharge lamp, there is a case where a light source for start-up assistance (e.g., an LED light source) is installed because it may be difficult to again turn on the lamp once the lamp is turned off. When control is performed by repeating turning-on and turning-off, the number of times of lighting and the lighting time of the LED light source for start-up assistance inevitably increase. On the other hand, the control method according to the present embodiment makes it possible to set a longer lighting time while satisfying the regulation range specified by ACGIH, and therefore the number of times of lighting and the lighting time of the LED light source for start-up assistance reduce, which contributes to a longer operating life.

In the case of the control described above, a waiting time (OFF holding time Ts) from when the primary current I1 reaches a zero value to when the switching element 22 shifts to the ON state is provided, and therefore there may be a time period when the secondary voltage V2 fluctuates. This fluctuation in the secondary voltage V2 is referred to as "ringing".

Figure 7:
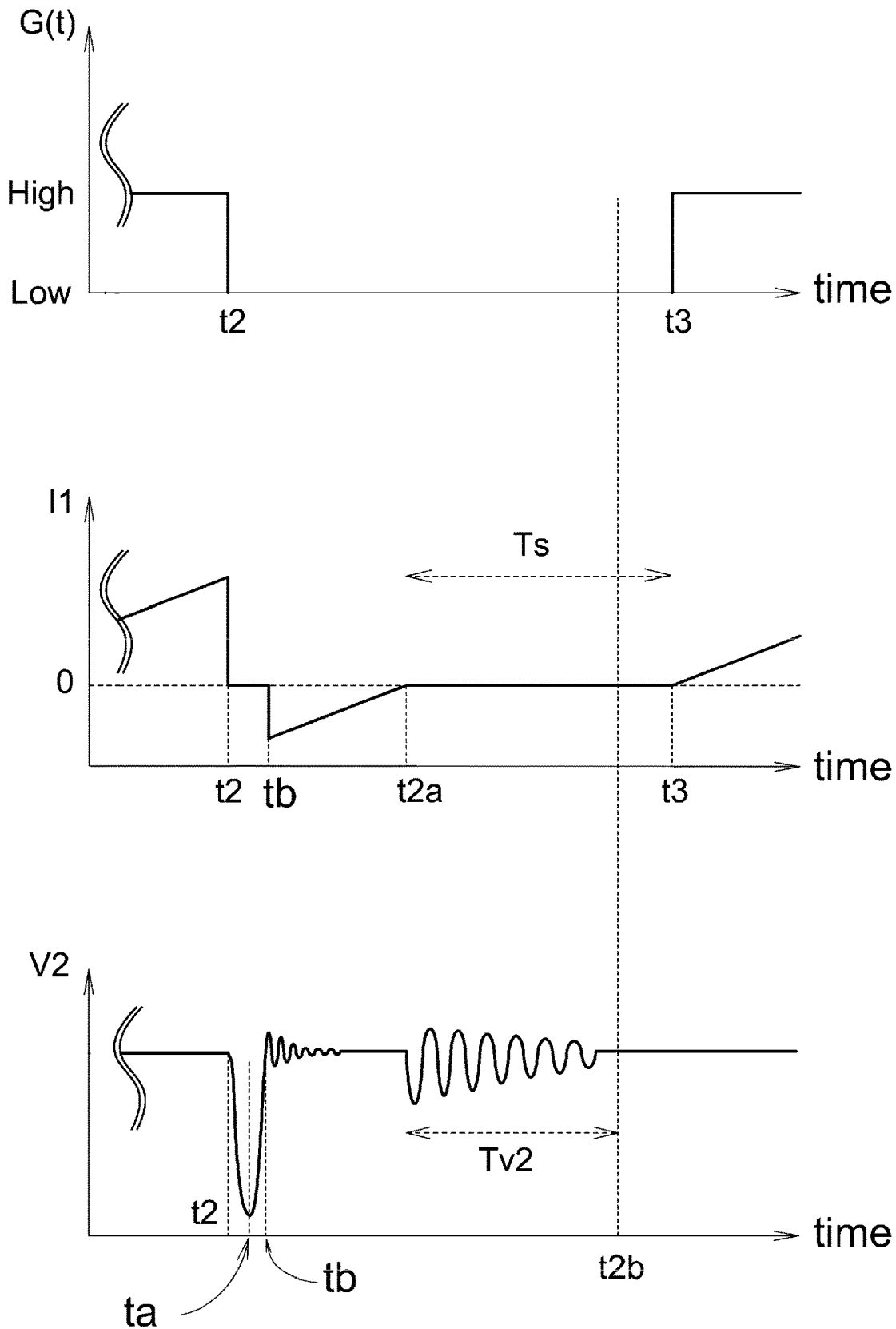
FIG. 7 is a partially enlarged diagram of FIG. 5.

FIG. 7 is a partially-enlarged diagram of FIG. 5 in which a fluctuation in the secondary voltage V2 is partially shown exaggeratingly. Hereinbelow, the behavior of the secondary voltage V2 will be described.

As described above in the section "PROBLEMS TO BE SOLVED BY THE INVENTION", when the flow of the secondary current I2 stops at the time tb, the primary voltage V1 is induced in the primary winding L1 of the transformer 30 so that the primary current I1 (regenerative current) starts to flow through the primary winding L1 in an opposite direction. In the OFF state of the switching element 22, this primary current I1 (regenerative current) continues to flow until the first terminal a1 of the primary winding L1 has the same electric potential as the positive electrode-side terminal of the direct-current power source 21 and then reaches a zero value.

On the other hand, on the secondary side of the transformer 30, an LC resonance circuit is formed by the secondary winding L2 and the equivalent capacitor C50 constituted by the dielectric barrier discharge lamp 50. Therefore, based on energy stored in the transformer 30, charge to and discharge from the equivalent capacitor C50 are repeated. As a result, the secondary voltage V2 is positive during charge to the equivalent capacitor C50, and on the other hand, the secondary voltage V2 is negative during discharge from the equivalent capacitor C50 so that ringing occurs. The frequency of the ringing is determined by the capacitance of the equivalent capacitor C50 and the inductance of the secondary winding L2.

It should be noted that in the LC resonance circuit, there are resistance components derived from the dielectric barrier discharge lamp 50 and the secondary winding L2 of the transformer 30. Therefore, the value of the secondary voltage V2 gradually decays. That is, after the time t2a when the primary current I1 reaches a zero value, the secondary voltage V2 decays while oscillating between positive and negative values and then converges (ringing period Tv2 in FIG. 7).

When the secondary voltage V2 relatively greatly fluctuates in the ringing period Tv2, it is preferred that the time t3 when the switching element 22 again switches to ON is set after the end of the ringing period Tv2. This makes it possible to always maintain the magnitude of the secondary voltage V2 substantially constant which is induced in the secondary winding L2 of the transformer 30 when the switching element 22 switches to OFF next (time t4: see FIG. 5). If the switching element 22 shifts to the ON state during the ringing period Tv2, there is a possibility that, particularly when the frequency of ringing is high, the value of the secondary voltage V2 at the time point when the switching element 22 switches to ON is different from the value of the secondary voltage V2 at the time point when the switching element 22 switches to ON based on the last control signal G(t). That is, when the ON/OFF control of the switching element 22 is repeatedly performed, there is a possibility that the light Ry1 emitted from the dielectric barrier discharge lamp 50 flickers due to the fluctuation of the value of the secondary voltage V2.

On the other hand, as shown in FIG. 7, when control is performed so that the switching element 22 switches to ON after the ringing of the secondary voltage V2 substantially converges (time t3), it is possible to stabilize a voltage applied to the dielectric barrier discharge lamp 50 when the switching element 22 switches to OFF at the next timing. In this case, the OFF holding time Ts may be set by the controller 24 so that the switching element 22 switches to ON at the timing when the fluctuation range of the secondary voltage V2 reduces to 10% or less of a peak value.

Other Embodiments

Hereinbelow, other embodiments of the light source device 1 or the lighting circuit 2 according to the present invention will be described.

<1> As described above, the controller 24 of the lighting circuit 2 according to the present embodiment performs control to shift the switching element 22 from the OFF state to the ON state after a lapse of the OFF holding time Ts. In order to reduce the irradiance of the light Ry1, the value of the OFF holding time Ts is set to be long. In this case, the frequency of ON/OFF switching of the switching element 22 inevitably reduces.

A reduction in the frequency of ON/OFF switching of the switching element 22 means that the frequency of application of an impulse-type voltage (secondary voltage V2) to the dielectric barrier discharge lamp 10 per unit of time reduces. When such control continues, there is a case where the dielectric barrier discharge lamp 10 goes out depending on the value of the OFF holding time Ts or the length of a continuous lighting time.

From the viewpoint of preventing the dielectric barrier discharge lamp 10 from going out, for example, as schematically shown in FIG. 8A, a higher secondary voltage V2 may intentionally be applied to the dielectric barrier discharge lamp 10 at a certain timing (time t12) in a state where the dielectric barrier discharge lamp 10 is lighted. Even when the amount of radicals derived from atoms constituting the light-emitting gas enclosed in the light-emitting tubes 15 is reduced, a large amount of radicals are generated again by applying a higher voltage to the dielectric barrier discharge lamp 10. Therefore, even when a standard voltage is applied to the dielectric barrier discharge lamp 10 after that, stable lighting can continuously be achieved.

To do this, an ON holding time Tg2 of the switching element 22 just before the application of a high secondary voltage V2 is set to be longer than a standard ON holding time Tg1 by the controller 24. The standard ON holding time Tg1 corresponds to a "first ON holding time", and the ON holding time Tg2 longer than the standard ON holding time Tg1 corresponds to a "second ON holding time". Further, control to shift the switching element 22 to the OFF state after the ON state during the first ON holding time corresponds to a "standard control mode", and control to shift the switching element 22 to the OFF state after the ON state during the second ON holding time corresponds to a "special control mode".

That is, the special control mode is a control mode executed at a low frequency during the execution of the standard control mode to continue a stable lighting state for a long time. More specifically, the total time of the time periods when the special control mode is executed is preferably 10% or less, more preferably 3% or less of the total time of the time periods when the standard control mode is executed.

It should be noted that a higher secondary voltage V2 is intentionally applied once at the time t12 in FIG. 8A, but may continuously be applied twice or more. Further, the second ON holding time Tg2 may be changed in multiple steps to smoothen a change in the ON holding time at the time of shift from the "standard control mode" in which the ON holding time is set to the first ON holding time Tg1 to the "special control mode" or conversely at the time of shift from the "special control mode" to the "standard control mode".

From the viewpoint of preventing the dielectric barrier discharge lamp 10 from going out, as shown in FIG. 8B, the frequency of application of the secondary voltage V2 may temporarily be increased at a certain timing. To do this, the frequency of ON/OFF switching of the switching element 22 is intentionally set to be higher by the controller 24 at the timing when the frequency of application of the secondary voltage V2 is increased (time period Tc2). In this case, control to execute ON/OFF switching of the switching element 22 at a standard switching frequency corresponds to a "standard control mode", and control to execute ON/OFF switching of the switching element 22 at a temporarily higher switching frequency corresponds to a "special control mode".

It should be noted that the method described with reference to FIG. 8A and the method described with reference to FIG. 8B may be combined. Specifically, when the special control mode is executed, the switching frequency may be higher with a longer ON holding time than in the standard control mode.

<2> There is a case where it takes time to light the dielectric barrier discharge lamp at start-up depending on the type of light-emitting gas filled in the light-emitting tubes. Particularly, in the lighting circuit 2 according to the present embodiment, as described above, since ON/OFF control of the switching element 22 is performed in a state where the OFF holding time Ts is set, the ON/OFF switching frequency of the switching element 22 tends to be relatively low. Therefore, when the control performed at the start of lighting is the same as that performed in the steady state where the dielectric barrier discharge lamp 10 continues to light, it may take time before the dielectric barrier discharge lamp 10 starts to light.

From such a viewpoint, control different from that in the steady state may be performed particularly at the start of lighting. Specifically, for example, as shown in FIG. 9A, in a time period Td0 at the start of lighting, control to increase the value of the secondary voltage V2 as compared to a time period Td1 in the steady state may be performed. This is achieved by setting the ON time of the switching element 22 to be longer than that in the steady state by the controller 24 as in the case described above with reference to FIG. 8A.

Alternatively, as shown in FIG. 9B, in the time period Td0 at the start of lighting, control to increase the frequency of application of the secondary voltage V2 as compared to the time period Td1 in the steady state may be performed. Further, as shown in FIG. 9C, in the time period Td0 at the start of lighting, control to increase both the value of the secondary voltage V2 and the frequency of application of the secondary voltage V2 as compared to the time period Td1 in the steady state may be performed.

In other words, the above-described "special control mode" may be executed in the time period Td0 at the start of lighting.

<3> The dielectric barrier discharge lamp 10 of the light source device 1 according to the present invention may have any structure and shape and is not limited to the example described above with reference to FIG. 4A and FIG. 4B. For example, as in the case of the dielectric barrier discharge lamp 50 shown in FIG. 1, the dielectric barrier discharge lamp 10 may have a structure in which the pair of electrodes (51, 52) are disposed on the outer walls opposed to each other with the light-emitting tubes being interposed between them.

<4> The present embodiment has been described above with reference to a case where the switching element 22 is connected between the negative electrode-side terminal of the direct-current power source 21 and the primary winding L1 of the transformer 30. However, the polarity may be reversed. Specifically, the switching element 22 may be connected between the positive electrode-side terminal of the direct-current power source 21 and the primary winding L1 of the transformer 30. Here, when the switching element 22 is constituted by a MOSFET, whether the MOSFET is of an n channel type or a p channel type is appropriately selected depending on the polarity of the direct-current power source 21 to be connected thereto.

DESCRIPTION OF REFERENCE SIGNS

1 Light source device
2 Lighting circuit
10 Dielectric barrier discharge lamp
15 Light-emitting tube
21 Direct-current power source
22 Switching element
23 Parasitic diode
24 Controller
25 Smoothing capacitor
30 Transformer
41 Cover
42 Main body casing
43 Light extraction surface
50 Dielectric barrier discharge lamp
90 Lighting circuit
94 Controller
C50 Equivalent capacitor
G Control signal
I1 Primary current
I2 Secondary current
L1 Primary winding
L2 Secondary winding
Ry1 Light
Ts OFF holding time
Tv2 Ringing period
V1 Primary voltage
V2 Secondary voltage
a1 First terminal
a2 Second terminal
c1 Closed circuit

The invention claimed is:

1. A light source device comprising a dielectric barrier discharge lamp and a lighting circuit for lighting the dielectric barrier discharge lamp, wherein
the lighting circuit comprises:
a direct-current power source,
a transformer having a primary winding connected to the direct-current power source and a secondary winding connected to the dielectric barrier discharge lamp,
a closed circuit in which the direct-current power source, the primary winding, and a switching element including a parasitic diode are serially connected, and
a controller to perform ON/OFF control of the switching element, and wherein the lighting circuit does not have a plurality of the transformers, and the controller executes:
- a first step to shift the switching element from an ON state to an OFF state, and
- a second step to shift the switching element from the OFF state to the ON state after a lapse of a predetermined OFF holding time from when a regenerative current flowing through the primary winding reaches a zero value after the first step.

2. The light source device according to claim 1, wherein the controller executes the second step after ringing of a voltage value between both terminals of the secondary winding of the transformer substantially converges.

3. The light source device according to claim 1, wherein the controller is configured to be able to change the OFF holding time.

4. The light source device according to claim 1, wherein the controller repeatedly executes the first step and the second step.

5. The light source device according to claim 4, wherein in a time period when the first step and the second step are repeatedly executed, each of the first steps is executed after a lapse of substantially a same ON holding time after a last second step is executed.

6. The light source device according to claim 4, wherein the controller has, in a time period when the first step and the second step are repeatedly executed, a standard control mode in which the first step is executed after a lapse of substantially a same first ON holding time after a last second step is executed and a special control mode in which the first step is executed after a lapse of a second ON holding time longer than the first ON holding time after a last second step is executed, and wherein
an execution frequency of the special control mode is lower than that of the standard control mode.

7. The light source device according to claim 6, wherein the controller executes the special control mode at least at start-up before lighting of the dielectric barrier discharge lamp starts.

8. The light source device according to claim 4, wherein the controller has a standard control mode in which the first step is executed after a lapse of substantially a same first ON holding time after a last second step is executed and a special control mode in which a switching frequency between the ON state and the OFF state is higher than that in the standard control mode, and wherein the special control mode is a control mode inserted between the standard control modes, and an execution frequency of the special control mode is lower than that of the standard control mode.

9. A lighting circuit for lighting a dielectric barrier discharge lamp, comprising:
- a direct-current power source,
- a transformer having a primary winding connected to the direct-current power source and a secondary winding connected to the dielectric barrier discharge lamp,
- a closed circuit in which the direct-current power source, the primary winding, and a switching element including a parasitic diode are serially connected, and
- a controller to perform ON/OFF control of the switching element, wherein the lighting circuit does not have a plurality of the transformers, and
the controller executes:
- a first step to shift the switching element from an ON state to an OFF state and
- a second step to shift the switching element from the OFF state to the ON state after a lapse of a predetermined OFF holding time from when a regenerative current flowing through the primary winding reaches a zero value after the first step.

10. A dielectric barrier discharge lamp lighting method using a lighting circuit, the lighting circuit comprising:
- a direct-current power source,
- a transformer having a primary winding connected to the direct-current power source and a secondary winding connected to the dielectric barrier discharge lamp, and
- a closed circuit in which the direct-current power source, the primary winding, and a switching element including a parasitic diode are serially connected,
the lighting circuit does not have a plurality of the transformers, and
the method comprising:
- a first step to shift the switching element from an ON state to an OFF state and
- a second step to shift the switching element from the OFF state to the ON state after a lapse of a predetermined OFF holding time from when a regenerative current flowing through the primary winding reaches a zero value after the first step.

* * * * *